Nov. 27, 1973  E. J. SALBEGO  3,775,542
PROCESS FOR TREATING FRAGMENTED SOYBEANS AND
PRODUCT MADE THEREFROM
Filed April 1, 1971  2 Sheets-Sheet 2

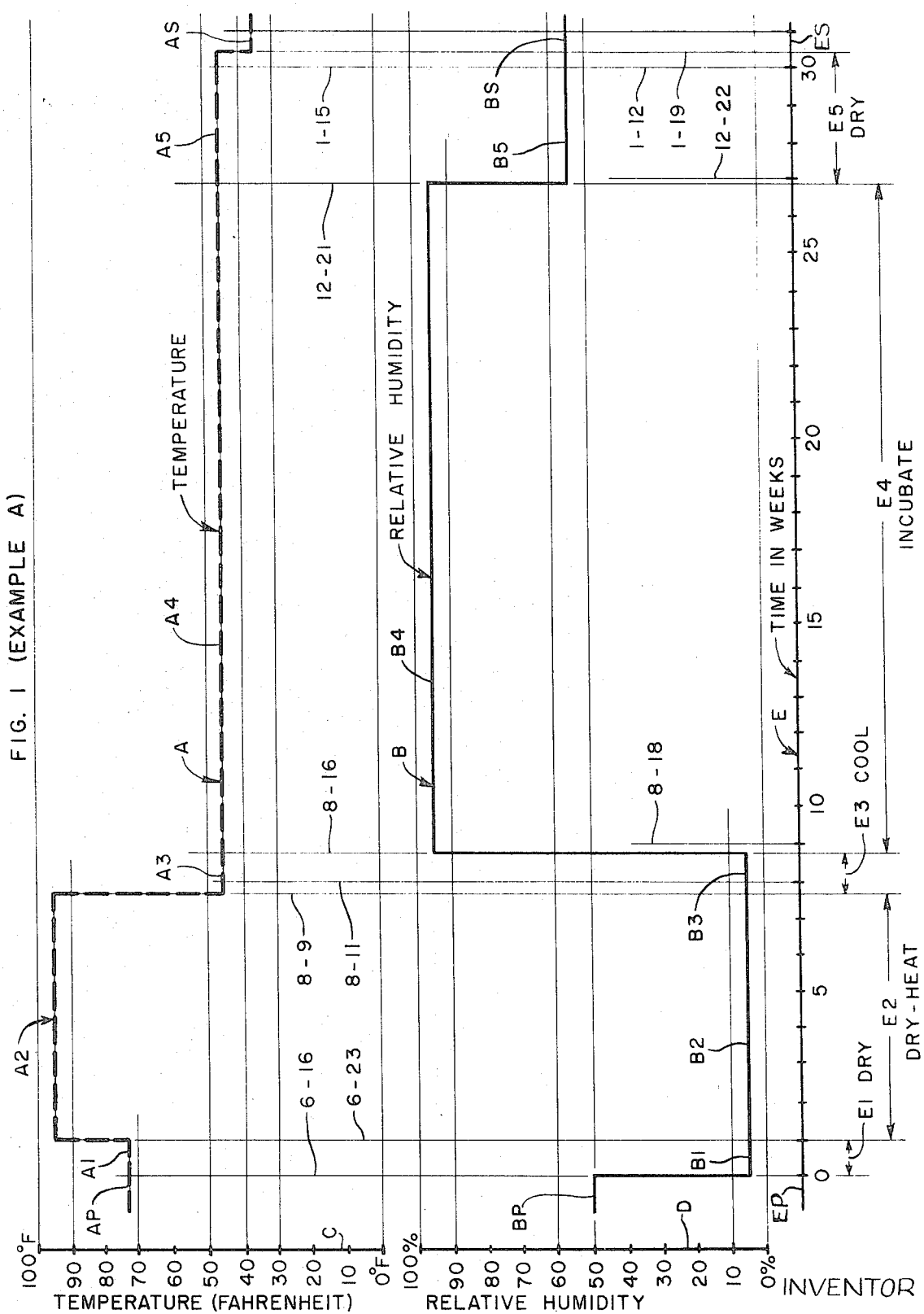

INVENTOR
EMIL JOHN SALBEGO
BY John I Bellamy
Atty.

United States Patent Office 3,775,542
Patented Nov. 27, 1973

3,775,542
PROCESS FOR TREATING FRAGMENTED SOYBEANS AND PRODUCT MADE THEREFROM
Emil John Salbego, Joliet, Ill.
Continuation-in-part of application Ser. No. 567,110, July 22, 1966, which is a continuation-in-part of applications Ser. No. 93,877 and Ser. No. 93,878, both Mar. 7, 1961, and Ser. No. 299,993, Aug. 5, 1963, all now abandoned. This application Apr. 1, 1971, Ser. No. 130,455
Int. Cl. A23k 3/00
U.S. Cl. 426—46                                7 Claims

ABSTRACT OF THE DISCLOSURE

Raw (uncooked) soybean flour either alone or mixed with soybean meal or other food material is subjected to a temperature of 70° F.–104° F. and to a surrounding atmosphere having a relative humidity of about 5 percent for at least three weeks, and then to a temperature of 45° F. in an atmosphere having a relative humidity of 95 percent. The product so treated can be mixed with soybean meal or other feed material. It gives an improved feed for livestock, including pigs, and appears to enhance the growth rate of pigs over the growth rate obtained with ordinary soybean feeds.

---

This application is the fifth in a series of my U.S. patent applications and is a continuation-in-part of the fourth application (now abandoned) of the series, which (in turn) is a continuation-in-part of each of the now abandoned first, second and third applications of the series, the four parent applications being designated below:

E. J. Salbego—1, filed Mar. 7, 1961, Ser. No. 93,877;
E. J. Salbego—2, filed Mar. 7, 1961, Ser. No. 93,878;
E. J. Salbego—3, filed Aug. 5, 1963, Ser. No. 299,993;
E. J. Salbego—4, filed July 22, 1966, Ser. No. 567,110

My present patent application relates to processes and to the compositions thereby produced, such compositions being for consumption by, or other use in the bodies of, animals and humans as a benefit to such animals and humans.

More particularly the invention relates to a process of treating raw (uncooked) soybean flour or meal containing such flour, and to the product so obtained.

Broadly stated, an object of the invention is to provide a treatment process for a more or less balanced blend of carbohydrates and proteins (along with such amounts of fat or oil as may be desired) existing as either plant-stored or animal-stored food or a mixture thereof, which process causes the blend of stored food to attain a beneficial potential through the growth therein of at least one strain or variety of miniature living organisms not ordinarily visible individually to the unaided eye, including microscopic and sub-microscopic organisms, along with any spore, seed, or other relatively dormant state of a living organism.

A more specific object is to provide a treatment process for raw (uncooked) soybean flour which would give a product which could be fed to livestock, including pigs, and would increase the growth rate of such animals over that obtained with fragmented soy beans not treated by my process.

Another specific object is to provide a treatment process for mixed foods, such as hog feed, which will selectively kill (or render indefinitely dormant) such living organisms as are in the mixed food and will incubate and render at least temporarily active at least one above-noted strain or variety of miniature living organisms.

A further more specific object is to provide the above noted treatment process, modified as may be needful, to so treat and element or component of a food mix for later incorporation in a mixed food.

A still more specific object is to provide the noted treatment process for fragmented soy beans.

A feature of a preferred form of the invention is that the treatment process includes a dry-heat period which either kills or renders satisfactorily dormant undesired organisms within the stored-food product without raising the temperature to such a level as to convert, or denature, desired enzymes and proteins.

A further object is to provide reliable and comparatively fast methods for testing the stored-feed product under treatment to ascertain when the treatment process may be terminated, and also to weed out any bags, parcels, or vats within which the treatment process was not a success.

A still further object is to provide useful compositions including a stored-food product treated according to my present invention as an essential ingredient, and also to provide new and useful food-supplement compositions.

A further feature is that a relatively small amount (such as a few grams) of a food-supplement composition according to the invention suffices to show a beneficial effect when consumed by an adult human or by an animal of about the size or weight of an adult human.

The foregoing and other objects and features of the invention and the manner of attaining them will become more apparent, and the invention itself will be better understood, by referring to the following description of examples of treatment processes and compositions taken in reference to the accompanying drawings comprising FIGS. 1 to 6, wherein:

FIG. 1 shows respective temperature and relative-humidity graphs for preferred Example A of fragmented soybean processing;

Figure 6:
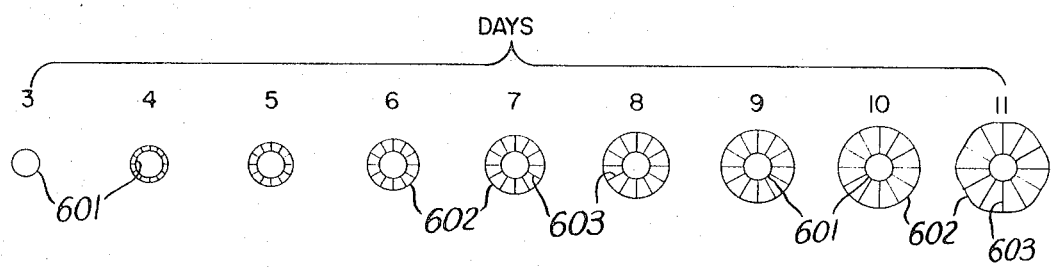
FIG. 6 shows a succession of views of an annular unit of the pattern on FIGS. 4 and 5 to show the day-to-day growth thereof.

In accordance with this invention an improved soybean feed for livestock is obtained by subjecting raw (uncooked) soybean flour, with or without soybean oil present, to a temperature of about 35° F.–50° F., preferably about 45° F., for at least three weeks and preferably at least four months, and exposed to an atmosphere having a relative humidity of at least 60 percent and preferably about 95 percent. During or after the above processing the raw soybean flour may also be mixed with other feed material such as soybean meal, shelled corn, oats, baled alfalfa and the like.

While raw soybean flour, made by grinding soybeans as they come from the field, may be used it is preferred to obtain meal after the oil has been extracted in a processing plant which uses an extraction process wherein the soybeans are not heated to an extent to produce substantial changes in their composition (i.e. substantially uncooked), and this meal is then ground without substantial heat to a flour. The oil in such raw soybean flour is substantially less than before the extraction process and generally ranges from about two to five percent by weight of the flour.

In a preferred embodiment of the invention which is described stepwise in detail in Example A, the raw soybean flour either alone or mixed with soybean meal or other food products is first maintained at a temperature of about 70°F.–104°F., preferably 75°F.–100° F., in a surrounding atmosphere of air or inert gas of approximately the same temperature and at a relative humidity of less than about 20 percent and preferably only about 5 percent for at least three weeks so as to bring about substantial drying of the flour. This dry heat treatment also appears to kill or render dormant unwanted and undesirable living organism. While this first step is not essential it is desirable and greatly preferred.

The next step is the essential incubation period.

In this incubation period the relative humidity of the surrounding atmosphere is maintained at, at least 60 percent and preferably about 95 percent while the temperature of the atmosphere and the flour is held at about 35° F.–50° F., preferably 45° F. This incubation period is at least three weeks and preferably for about four months or longer, in order to obtain maximum growth of the desired living organisms which I believe partly explains the growth-promoting results obtained with feed containing soybean flour so treated.

The incubation period, in the preferred treatment, is followed by drying at, for example, 45° F. and 55 percent relative humidity for several days (three or more days, preferably twenty-five days or more).

Following the drying period, I prefer to have a storage period with the relative humidity being 50–60 percent and the temperature about 35° F. The treated material can be stored indefinitely under those temperature and humidity conditions.

The following specific examples are given to illustrate the invention:

EXAMPLE A—FIG. 1

Referring specifically to FIG. 1, Example A (covering the preferred treatment of fragmented soybeans in the form of a desired number of bags of raw (uncooked) soybean flour contained in porous bags, 50 lbs. to the bag, for example) will now be described.

The particular flour used in the examples was obtained by grinding dry, uncooked soybean meal to obtain an uncooked flour of —100 mesh U.S. Standard Screen Series. The oil content was about 3 percent, but this is not critical.

FIG. 1 shows chained-line graph A of the ambient temperature to which the bagged flour is exposed before, during, and after the treatment process, along with solid-line graph B of the accompanying ambient relative humidity. The temperature is shown in degrees Fahrenheit on scale C; the relative humidity is shown in percent on scale D; and the time (in weeks) is shown on scale E.

Keeping in mind that I was taking advantage of the natural heat and humidity cycle which caused the pig feed to attain a superior condition, I started my treatment for Example A of FIG. 1 on June 16, being about the date when I had had the successful batch of pig feed ground, and continued the treatment process until success was attained early the following year.

Before June 16 it is assumed that the flour to be treated was stored during the time indicated by the preliminary time mark EP at the respective temperature and humidity indicated by segments AP and BP of Graphs A and B, respectively.

The first portion of the period required by the treatment process is the portion E1 which lasts from June 16 to June 29, during which the temperature at A1 is about the same as the temperature indicated by Graph segment AP (a nominal room temperature of 72 degrees F.), but the relative humidity indicated by Graph segment B1 is much lower than the relative humidity indicated by Graph segment BP.

The drawing indicates that the flour bags under treatment were placed on June 16 within the location where the relative humidity is on the order of about 5%, at which value it is held for some time thereafter. The material to be treated is thus dried, at least on the exterior parts of the bags of material to such an extent that they enter dry heat period E2 in a sufficiently dry condition that undesired growths do not take place in the material under treatment.

The drawing further indicates that the dry heat (selective killing) portion of the period begins on June 23, and extends to Aug. 9, during which time relative humidity at B2 is held down to about 5% while the temperature of the treatment room or location is maintained up to about 95 degrees F. During this dry heat portion, unwanted living organisms are killed, maimed, or otherwise rendered satisfactorily dormant or ineffective.

The dry-heat portion E2 of the treatment period is followed by a transition portion E3 during which the humidity is maintained at the low level indicated by B3 from Aug. 9 to Aug. 16, during which time the ambient temperature is lowered to about 45 degrees, as indicated by graph segment A3. Thus, the material under treatment is cooled for several days before it is subjected to the high relative humidity employed in the next (incubation) portion of the treatment period.

Portion E4 of the treatment period is used to incubate the desired living organisms which remain alive or renewable after the dry heat portion E2 and the cooling portion E3 of the treatment period. During the incubation portion E4 of the period the relative humidity is maintained at about 95%, as indicated by segment B4 of graph B, while the temperature is held at about 45 degrees F. as is indicated by segment A4 of graph A. The incubate portion E4 of the treatment period lasts from Aug. 16 to Dec. 21.

The incubate portion E4 is followed by a dry (drying) portion E5 which, in the illustrative example, lasts from Dec. 21 of the starting year to Jan. 15 of the next year. The temperature and relative humidity during this dry portion E5 are as indicated by graph segments A5 and B5, being about 45 degrees F. and 55% respectively.

Following the drying portion E5 of the treatment period, a storage period starts. It is indicated by segment ES of the time scale E and by segments BS and AS of the graph. Graph segment BS indicates that the storage relative humidity is preferably between 50% and 60%, while the storage temperature indicated by AS is preferably about 35 degrees F. It has been found that the treated material can be stored relatively indefinitely under these relative-humidity and temperature conditions. The drying period E5 is important largely in that it allows at least the outer part of the bags of treated material to dry rather well before the temperature is dropped from that indicated by graph segment A5 to that indicated by graph segment AS, the latter being very above freezing. Sometimes, the temperature-regulating apparatus or mechanism fails and drops the temperature a few degrees below that desired. The drying portion of the period is thus a precaution against such an eventually causing the relatively wet contents of the treated material at the end of period E4 to freeze and spoil, which will not occur after such material has been dried to a stable condition with respect to the low ambient humidity indicated by graph segments B5 and BS.

In carrying out the treatment process according to Example A, I used a convenient room of my house for time portions E1, E2, and E3, such as a closet or an unused bedroom within which I could conveniently maintain the bags of material being treated at the temperature and humidity conditions indicated by graph segments A1 to A3 and B1 to B3. For this purpose I took advantage of the temperature and relative-humidity conditions existing in and around my home during the period portions indicated by the dates hereinbefore given and appearing on the drawing for portions E1 to E3 of the treatment period. For example, I was able to maintain the relatively low relative humidity indicated by graph segments B1 to B3 by the use of a dehumidifier. The temperature indicated by graph segment A1 is about the temperature which ordinarily existed in my home in the indicated portion of the treatment period from June 16 to June 23; the relatively high temperature indicated by graph segment A2, from June 23 to August 9 was obtained by supplementing the summer-heat effect on the outside of the house by such locally applied heating as may be necessary, preferably thermostatically controlled. In my experience, no harm results if the temperature indicated by graph segment A2 rises to a point above 100 degrees F. on hot days, so long as it does not go materially above about 104 degrees F. for an extended length of time, that being understood to be about the point above which conversion of enzymes and proteins occurs in the material under treatment.

The portion E4 of the treatment period was carried out, for the most part, in my attached garage, built as a part of the house, and having a cement floor.

During portion E3 and the first part of portion E4 of the treatment period, some refrigeration was usually required, as by a so-called air conditioning unit, to maintain the temperature no higher than about 45 degrees F. indicated by graph segments A3 to A5. However, after the seasonable decline of temperature had occurred to bring the mean outside temperature to around 45 degrees F., no further refrigeration was required except possibly for any unseasonably warm days of late fall or early winter.

The high relative humidity indicated by graph segment B4 (in the neighborhood of 95%) was obtained by keeping the cement floor of the garage sufficiently wet, as by strewing wetted newspapers over the lower parts of the floor and sprinkling them with additional water as required. During my experiments I used no fans or other blowing devices to avoid startification of the air in the treatment location (attached garage). Instead, I upended some empty barrels and placed each bag of the product under treatment on top of an upended empty barrel, and I read the relative humidity on a hygrometer calibrated from 0% to 100% and placed atop one of the upended barrels, about level with the bottom of the bags. The cement floor was kept sufficiently wetted as in the indicated manner to cause the hygrometer to read (about 95%) the relative humidity indicated by graph segment B4.

Further, in order to assist in the incubation of the desired living organisms within the material under treatment, I sprinkled a patch of the higher part of the cement floor rather generously with a commercial ammonium-nitrate fertilizer, such a patch being perhaps a few yards square and just thick enough that it nearly covered the floor. The fumes released by this fertilizer within the high humidity of the treatment room acted somehow, according to my results, to promote more readily the growth or incubation of the desired living organisms within the material under treatment.

EXAMPLE B—FIG. 1

Example B is the same as Example A except that the use of the indicated commercial fertilizer is omitted, the temperature and humidity conditions being the same as described and as shown in FIG. 1.

Without the use of the indicated fertilizer to release its fumes within the enclosure where portion E4 of FIG. 1 was being carried out, many more of the bags of material under treatment failed to develop the desired living or live organisms.

EXAMPLE C

In Example C, the dry heat period E2 of FIG. 1 is replaced by the simple storing of bags of soybean flour within an unused but relatively hot room of the house, such as a clothes closet, where the heat of the summer may be augmented by a thermostatically controlled heating element if desired, but with no special provision to lower the relative humidity such as to the value indicated by graph segment B2 of FIG. 1, the bags being left there substantially throughout the period of high summer heat, generally allowing them to follow the temperature imposed by the mean outside temperature of summer in Joliet and its environs.

Next, when the cooler days of August or September arrive, the bags containing the soybean flour under treatment were subjected to a high relative humidity somewhat as illustrated in FIG. 1, and hereinbefore described with respect to the incubate portion E4. For most of the bags treated in this manner, the desired living organisms failed to develop for a number of reasons. For example, worms or larvae developed in many bags, spoiling the contents. Additionally visible molds and other undesired growths appeared in several of the bags, spoiling the contents for the intended purpose. Occasionally, however, one of the bags would develop satisfactorily and reach the desired state of having therein the satisfactorily incubated desired living organisms. This occurred after only about four weeks, for example, of incubation, as contrasted with the longer incubation portion E4 of FIG. 1, from Aug. 16 to Dec. 21. Thus, it appears that the desired live organisms, if they develop at all, can develop much more quickly without the dry-heat portion E2 of the treatment according to FIG. 1 than when such dry-heat portion is incorporated.

EXAMPLE D—HOG FEED

Example D relates to the hog feed (or pig feed) containing raw (uncooked) soybean flour treated as above.

According to my notes the noted batch of 435 pounds of mash or feed for the growing pigs was made up as follows.

| | Pounds |
|---|---|
| Soy bean meal containing 20% uncooked treated soybean flour | 50 |
| Shelled corn | 200 |
| Oats | 100 |
| Baled alfalfa | 60 |
| Dry powdered milk | 25 |
| Total mix | 435 |

EXAMPLE E

As further example, soybean flour in paper bags is exposed to an ambient temperature ranging between 75 and 80 degrees F., with the ambient relative humidity being between 90 and 100%, for a few days. Next, the ambient temperature is lowered to 70 to 75 degrees F., and the relative humidity is lowered to 70 to 80% for about four weeks. At the end of this four-week period, such bags of soybean flour as are not spoiled by mold, fermentation, worms, and the like should be taking on a firm texture indicative of successful treatment. After the firm texture has become a hardened state, the temperature is reduced to no lower than 55 to 70 degrees F. depending upon the hardness of the product. The harder the product is, the lower the temperature may be dropped.

Testing the treated product

Two tests have been devised for ascertaining whether or not the soybean flour under treatment has been properly treated, or responded to the treatment as intended. These tests are preferably conducted only after the product under treatment has taken on a firm and rather hard texture similar to that of moist pound cake, as that condition of the product is one of the first signs of success of the treatment. The noted tests are to determine just about when the treatment has reached the point beyond which further treatment would be useless, or might even be harmful.

Referring for example to FIG. 1 and Example A therein illustrated, some of the bags of flour under treatment may exhibit satisfactory firmness or hardness of texture well in advance of the indicated date of Dec. 21. When that occurs, a sample of the contents of any such bag may be tested by either test 1 or test 2.

Figure 2:
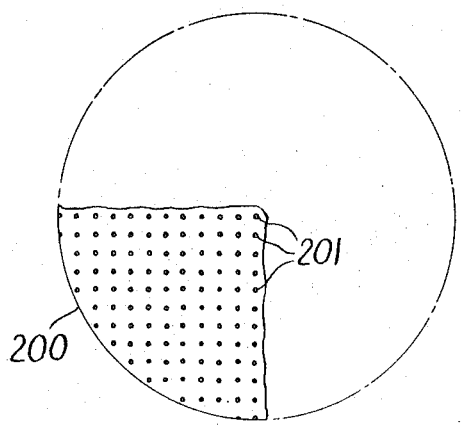
FIGS. 2 and 3 are a top and front view of a spooned-on test mixture of a sample of the product of FIG. 1, mixed with a desired portion of sweet chocolate.
Figure 3:
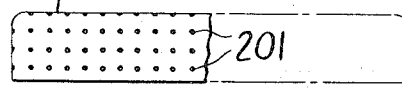

Test 1 is conducted by mixing a 30-gram quantity, preferably broken up and sifted, of the treated product with 142 grams of warmed and softened sweet chocolate, that being about as much of the sifted treated product as can be readily incorporated in the warmed mixture. In warming the chocolate, care must be taken that it is not brought materially above 104 degrees F. or thereabouts, since higher temperatures have (or tend to have) a deleterious effect upon either the treated product or the incubated organisms therein. A sample of the warmed-chocolate mixture may be dropped upon a piece of tin foil as by spooning it thereonto to form a generally round or cookie-like shape shown double-scale in FIGS. 2 and 3. The top surface of 200 will not be as smooth and flat as is indicated in the drawing, as the mixture is usually too stiff to settle down to a flat surface, but that characteristic of the warmed mixture was omitted from the drawing to avoid unnecessary complication therein.

These tests were usually performed along about early winter when the sun rises at about the least angle above the horizon. I found that if the test sample 200 (FIGS. 2 and 3) was left indefinitely at the nominal room temperature of 72 degrees F. which I normally maintain in my home by thermostatic control, no particular manifestation occurred; however, I found that if I set the tin foil on which item 200 was placed on the inside window ledge where it received sunlight, the warmth of the sun's rays shining through the glass of the window and the glass of the storm window would cause the chocolate of the mixture to soften and take on a melted sheen. During the time of the test, about two hours a day was the length of time during which the sun shone upon the test sample.

After the third daily two-hour exposure of the test sample to sunlight, and after the sample 200 had cooled to the noted nominal room temperature, a large number of rather evenly spaced white dots 201 appeared thereon, the general color of the sample being a chocolate brown, with the white dots appearing on that chocolate brown background. These dots are comparatively close together as is indicated by the double scale drawing, FIGS. 2 and 3. The appearance of these dots after three two-hour days of sunlight as above indicated shows that the bag of product from which the sample was taken is ready for termination of the treatment and is ready to be placed into storage as described for Example A.

Sometimes the treatment described could be terminated well in advance of the indicated date of Dec. 21 while at other times it needed to be carried out for a longer period. Thus, the test results were used to determine when the incubate period E4 of FIG. 1, for example, should be terminated.

The second test method is somwhat similar to the first, but it is more comprehensive in that it may be employed also to show many other facts besides the one fact that the incubate portion of the treatment can be discontinued.

In making either of the two tests, the caked or lumped sample of the more or less fully treated product is first broken up, as by hand, and then passed through a sifter which withholds the unbroken lumps. Further, in maknig the second test, any ingredient such as oatmeal is preferably more finely divided than commercially available products are, as by running it through a home coffee grinder, while ingredients such as cornmeal and granulated lecithin may be used without further grinding.

Preferably, in preparing the test mixture, 84 grams of the treated product are thoroughly mixed with 42 grams of lecithin and 24 grams of oatmeal to make a 150-gram batch for test purposes. The treated product is slightly in excess of 11% of the dry mixture. If it be desired to make up all of the mixed test batch for testing purposes, 710 grams of a warmed, workable milk chocolate are used. In my work, I used only ⅕ of the mixed dry ingredients (30 grams) and mixed it with 142 grams of sweet chocolate. It is important in test 2, as it is in test 1, that the chocolate be warmed to a temperature no higher than will permit it to be worked, for too high a heat in the chocolate (say a heat substantially higher than 104 degrees F.) may have an undesired effect on the treated product as well as upon the incubated organisms therein. Spoonfuls of a mixture of warmed chocolate, with the noted combination of the treated product with lecithin and oatmeal thoroughly mixed therewith, are then placed on tin foil (or on a tray) one such spoonful being shown at 400 in FIGS. 4 and 5. Here again, the spoonfuls 400, each assuming a generally cookie-like shape, are exposed to sunlight for about two hours a day under the conditions indicated hereinbefore.

For the first two days, nothing ordinarily shows on the brown or chocolate-colored surface of the sample 400, the chocolate merely warming and softening while the sunlight strikes it and then hardening after the sunlight period is over.

Figure 4:
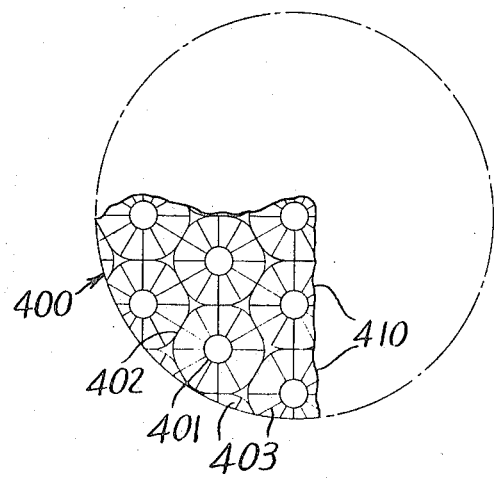
FIGS. 4 and 5 are top and front views of a similar spooned-on test mixture containing additional ingredients.
Figure 5:
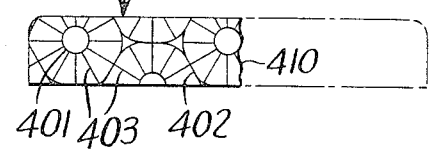

However, after the third two-hour period of sunlight, when the item 400 of FIGS. 4 and 5 has cooled, small white circles 401 appear more or less regularly spaced apart from each other along the top surface of 400, as well as along the generally upright outer peripheral surface thereof. The formation of these small circles 401 spaced apart about as shown in the double scale drawing of FIGS. 4 and 5, indicates that the flour under treatment has arrived at a satisfactory state, and that it is ready to be prepared for, and to be placed in, storage as described.

Various mixtures for utilizing the treated product

Various mixtures for utilizing the treated product are hereinafter given. A test mixture of the general nature of that described for test 2 may be used to test the desirability of the mixture. For this purpose, reference is had to the double scaled views shown in FIGS. 4 to 6. In FIG. 6, for example, various views are shown of a single item of pattern similar to the items 410 of FIGS. 4 and 5, and above each view there is a numeral indicating the number of two-hour days of sunlight under the previously described conditions which were required to produce the design indicated in the view. For example, after one two-hour day, and after two two-hour days, nothing ordinarily appears on a test object such as 400 of FIGS. 4 and 5, with the first appearance occurring after the third two-hour day of sunlight, when a number of ring-like formations 401, 601 appear as a whitish mark on the surface of the chocolate after it is cooled following such third two-hour exposure to sunlight.

After the fourth day, each ring-like configuration 601 is surrounded by an outer ring-like configuration 602, the two like design rings being very close together. As the days progress, the outer ring 602 becomes larger, with the inner ring 601 remaining at about its initial size. After the eleventh day, the outer rings 402, 602 have expanded to where they touch each other taking on the general appearance of a hexagon with rounded corners. Generally radial "spokes" 403, 603 connect the inner and outer circles, being also white marks against a brown background.

It should be pointed out that, when the sunlight fails for a couple of hours on a test object such as 400 of FIGS. 4 and 5, the white marks dissappear from normal view under the warmth imposed by the sunlight, which warmth gently softens the chocolate binder material, but the lines reappear after the test object is no longer receiving sunlight and cools to the noted nominal room temperature, such as 72 degrees F. Moreover, the circles 401, 601 and 402, 602 are not usually as geometrically regular as the drawings show, nor are the items 201 (FIGS. 2 and 3) or the items 410 (FIGS. 4 and 5) usually as regularly spaced as shown, tending to appear at random. Also, the inner and outer circles have serrated inner and outer edges (difficult to show on the drawing), while the interconnecting spokes 403 and 603 lack these serrations for a mixture such as that given for test 2.

I am well aware of the fact that the process of developing these test items can be speeded up, for I found in one instance that a whitish design, such as the inner circle 401 or 601 (FIGS. 4 to 6) or a whitish dot 201 (FIGS. 2 and 3) occurred after only one day of sunlight. I attribute that to an unexpected change to a warmer outside temperature, coupled with my having set the thermostat for a higher inside temperature than the nominal 72 degree F. room temperature that I usually employed. Accordingly it seems clear to me that heat lamps could be used to hasten the process and that so called hot plates could be used, provided that (in each case) care is taken to avoid raising the temperature to a level whereat it tends to convert the protein (for example) or to injure the incubated organisms.

Mixtures 1 to 15 for utilizing the treated product are given in the following composition table.

placed in a vat warmed for fast maturation, following which it is encapsulated, for example, and then refrigerated until used.

It is here noted that the mixtures such as those given in the columns (1 to 15) of the foregoing composition table can be tested and classified as bad, poor, or good by any one using the test procedure hereinbefore given. If the treated product (soybean flour) be found to have been sumessfully treated, as by tests described in connection with FIGS. 2 to 5, then by thoroughly mixing 30 grams (for example) of any composition of the table with about 142 grams of sweet workably warmed chocolate, going through the test procedure outlined, and allowing the samples such as 400 (FIGS. 4 and 5) to reach full maturity. Simple inspection of pattern members 410 suffices to show whether the mixture under test is bad, poor, or good. A "bad" mixture is one showing very few of the pattern elements such as 410 of FIGS. 4 and 5, with the ones appearing being very sketchy or ragged. A "poor" mixture is one usually having comparatively large pattern elements or having the spokes 403 or 603 serrated or doubled, for example, while a "good" mixture has pattern elements as shown in FIGS. 4 to 6.

COMPOSITION TABLE

| | Mixture | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| | Gr. | Gr. | Gr. | Gr. | Gr. | Gr. | Gr. | Gr. | Gr. | Gr. | Gr. | Gr. | Gr. | Gr. | Gr. |
| | Br. | Gd. | Pr. | Gd. | Gd. | Gd. | Gd. | Pr. | Pr. | Pr. | Pr. | Pr. | Gd. | Pr. | Pr. |
| Treated product | 25 | 84 | 25 | 25 | 17 | 24 | 85 | 75 | 80 | 87 | 83 | 81 | 88 | 86 | 84 |
| Lecithin | 50 | 42 | 20 | 10 | 8 | 11 | 40 | 36 | 40 | 46 | 41 | 39 | 46 | 44 | 40 |
| Oatmeal | 200 | 24 | 15 | 10 | 5 | 9 | 25 | 21 | 20 | 28 | 22 | 20 | 28 | 26 | 25 |
| Cornmeal | 50 | | | | | | | | 10 | | | | | | |
| Nonfat dry milk | | | | | | | | | | 18 | 20 | 14 | 26 | 24 | |
| Dry Yeast | | | | | | | | | | 7 | | 7 | 7 | | |
| Gelatin | | | | | | | | | | 9 | 18 | | 18 | 18 | 9 |
| Nicotinic acid | | | | | | | 1 | 1 | 1 | 1 | | 1 | 1 | 1 | 1 |
| Vitamin A | | | | | | | | X | X | X | | | | | X |
| Total | 325 | 150 | 60 | 45 | 30 | 44 | 151 | 133+ | 151+ | 196+ | 184 | 162 | 214 | 199 | 159+ |

NOTE.—X=300,000 U.S.P. units.

In the foregoing composition table, the numbers opposite the listed components, appearing in the respective columns 1 to 15, represent grams as indicated by "Gr." at the head of each column. The parts, of course, could be given in ounces, pounds, and the like, so long as indicated proportions are maintained.

The information given in the columns 1 to 15 of the table is the same as that given in the respective fifteen examples I to XV of the hereinbefore identified application. E. J. Salbego—1. Extensive tests have shown me which mixtures are good "Gd.,"which are poor "Pr.," and which is bad "Bd.," as regards serving its intended purpose. The columns are labeled accordingly.

One way of utilizing any useful mixture, listed in the noted composition table, for example, is to give it directly to the human or animal recipient, a level tablespoon (for example) to an adult human or to an animal about the size of an adult human. Alternatively, the composition in the desired amount may be mixed with and eaten with other food. If desired, the composition may be wetted to an adhesive state and made into small, medium, or large balls or pills, glazed with sugar if desired, or even chocolate coated.

When desired, sweet (or milk) chocolate may be used as the binder as in making the described tests, the amounts spooned out, dropped out, or otherwise divided out being sized for the desired "dosage."

It is considered best to keep the mixed composition cool or cold until it is used, unless it is warmed to allow the live organisms to grow to maturity in the moistened or chocolate impregnated form, following which the matured composition is preferably refrigerated until used.

If desired, the mix may be moistened or wetted and

Other treatment processes

Other treatment processes may be used. For example, referring to FIG. 1, the incubate period E4 may be replaced by a shorter incubation period during which time the fragmented soybean product under treatment is wetted or even made soup-like and placed in vats for incubation at a temperature such as that indicated by graph segment A4.

A further modified treatment process includes placing any and all other ingredients of a mix such as any one of the mixes 1 to 15 of the composition table in with the soybean product under treatment following the dry heat portion E2 and before the incubate portion E4 of the process. The incubate portion may be as described for E4 or the vat alternative may be employed, with the mixture as a dough, a paste, or a soup, as desired.

A still further modified treatment process includes mixing the dry additive materials (any column 1 to 15 of the composition table) with the untreated soybean flour before time zero of FIG. 1, following which the treatment process may be carried out fully according to Example A, FIG. 1, or according to any applicable herein described modification.

Inoculation treatment

As far as my results are concerned, only fragmented soybeans containing uncooked soybean flour ordinarily develop or respond as desired to a treatment process according to FIG. 1, for example. In my opinion the reason for this is that the desired live miniature organisms which make the treated product desirable as described are peculiar to soybeans. However, it is believed that these same desired miniature organisms can live and thrive in other substances than fragmented soybeans. For example, such organisms could very likely grow in most any fragmented plant seed by the addition of a small amount of soybean oil. Such a product can be inoculated with the live miniature organisms which bring about the desired results, preferably after the dry heat portion E2 of FIG. 1 and before the incubate portion E4 or any described modification thereof. The noted inoculation may, for example, be carried out by mixing some of the partly treated or fully treated fragmented soybean containing raw soybean flour with the non-soybean product, either just before or just after the incubate portion E4 of FIG. 1 or a herein described alternative incubate portion, keeping in mind that the dry heat portion E2 of FIG. 1 has accomplished the described selective killing of organisms within the product under treatment. Other examples of inoculation will undoubtedly present themselves to those skilled in the art to which the subject matter of this application pertains.

Further, stored food generally may be inoculated with the desired miniature living organisms and then suitably treated to bring out the described desired properties of the food material, including both plant-stored and animal-stored food. Particularly, under the heading animal-stored food, I include eggs as well as the flesh of animal creatures such as whole sardines for example. Plant-stored foods include plant seeds and also includes bulbs, tubers, and roots (sweet potatoes and yams for example), as well as stalks such as alfalfa, hay, and sugar cane, by way of examples.

Referring again to the fragmented soybeans which appear to be the prime source of the desired living organisms, it should be noted that full cooked flour, by way of example, can perhaps be restored to its usefulness as a prime source of the desired living organisms to be brought out by a process such as that illustrated in FIG. 1 by mixing such full cooked flour with a portion of green (raw) or non-cooked flour.

I claim:
1. The process for treating raw soybean flour which comprises subjecting such flour for at least three weeks to a temperature of 35° F.–50° F. and to an atmosphere having a high relative humidity of at least 60 percent.
2. The process of claim 1 wherein the temperature is 45° F. and the relative humidity is 95 percent.
3. The process of claim 1 wherein the said raw soybean flour contains a percentage of oil from two to five percent by weight.
4. The process for treating raw soybean flour which comprises the steps of (1) maintaining the soybean flour and surrounding atmosphere at a temperature in the range of 70° F.–104° F., coupled with a relatively low ambient relative humidity of less than 20 percent for at least three weeks, and (2) lowering the ambient temperature to the region of 35°F.–50° F., while raising the ambient relative humidity to at least 60 percent, and maintaining such stated ambient-temperature and relative-humidity values for at least three weeks.
5. The process of claim 4 wherein the relative humidity in the first step is 5 percent and the time of drying is at least three weeks.
6. The process of claim 4 wherein the raw soybean flour is mixed with soybean meal.
7. The process of claim 4 wherein during the recited second step ammonia gas is released into the ambient atmosphere to hasten the incubation process.

References Cited
UNITED STATES PATENTS
3,261,688   7/1966   McCutchon _____ 99—9

A. LOUIS MONACELL, Primary Examiner

R. J. WARDEN, Assistant Examiner

U.S. Cl. X.R.
426—459

PO-1050
(5/69)

UNITED STATES PATENT OFFICE
CERTIFICATE OF CORRECTION

Patent No. __3,775,542__  Dated __November 27, 1973__

Inventor(s) __E. J. SALBEGO__

It is certified that error appears in the above-identified patent and that said Letters Patent are hereby corrected as shown below:

Column 3, line 66

Change "June 29" to -- June 23 --.

Column 4, line 52

After "very", insert --little--.

Column 4, line 56

Change "eventually" to --eventuality--.

Column 5, line 35

Change "startification" to --stratification--.

Column 7, line 65

After "in", change "makning" to --making--.

Column 10, line 9

Change "sumessfully" to --successfully--.

Signed and sealed this 16th day of April 1974.

(SEAL)
Attest:

EDWARD M. FLETCHER, JR.           C. MARSHALL DANN
Attesting Officer                  Commissioner of Patents